2,901,354

METHOD OF PROTECTING DRY SAUSAGE AGAINST DISCOLORATION AND RANCIDITY

Wilson F. Douglass and William E. Phalen, Omaha, Nebr., assignors to The Cudahy Packing Company No Drawing. Application August 18, 1955
Serial No. 529,356

14 Claims. (Cl. 99—109)

This invention relates to a method of treating dry sausage to prolong the time that it may be kept without objectionable discoloration taking place and without the development of rancidity.

Dry sausage (or summer sausage, as it is sometimes called), to be appealing to customers, should have a definite color pattern, both in its outer surface and in its cut surfaces. The lean meat should be a lively red, on the order of a dark cherry-red, and the contrasting fat particles which are interspersed with the lean should be bright and as near white as possible; and it is most desirable that this color pattern should be maintained for a considerable time after the sausage is finished or after being cut.

Unfortunately the pigments of the lean meat of the sausage and the fat therein are subject to oxidation when exposed to the oxygen of the air. This oxidation results in a change in the pigments to a brownish, grayish or greenish color and, at the same time, the development of rancidity in the fat. These changes, particularly the discoloration, impair the salability of the product, even though it may remain edible and wholesome; and the sausage after such changes therein occur can be disposed of only at reduced prices as compared to non-discolored sausage.

Heretofore no satisfactory method of overcoming this difficulty has been discovered, despite the evident, and even urgent, need for it, and it is the general object of this invention to provide such a method.

Oxidation is a function of the time of exposure of pigment and fat to oxygen. Dry sausage surfaces are particularly sensitive to oxidation because the meat in such sausage has usually attained considerable age before it is consumed in the final form. For example, it is considered to be reasonable procedure to use meat which has been held in the frozen state for as much as sixty days before it is incorporated into dry sausage. To conform to government regulations, as well as good manufacturing practice, a period of one to four months is required from the time the meat is first chopped for such sausage to the time it is ready for consumption. The length of time will vary depending on the particular type of dry sausage involved.

After the sausage is finished, many weeks may elapse before it is consumed. This is considered normal in the trade.

Thus it will be seen that a very long time may elapse from the time of slaughter of an animal until the meat thereof is consumed in the form of dry sausage. During all this period the meat is exposed to oxygen of the air.

Freshly sliced dry sausage may be of excellent appearance and sweetness of fat. However, the slices present a large surface to the oxygen of the air and in a very short time, usually in a few days, the slices may become discolored and rancid and wholly unappetizing. This is a great disadvantage since it strictly limits to a very short time the period during which sliced dry sausage may be offered for sale before it becomes unappetizing. Refrigeration, or even freezing, will not prevent this oxidation.

After giving a great deal of thought to this serious problem, we developed the present invention. We concluded that we could incorporate in dry sausage, at the time of manufacture, some non-toxic substance or substances which might combat or inhibit the oxidation process which we have described above. It would of course be necessary to use substances which did not impart an undesirable flavor or odor to the sausage in the amount used.

After extensive experimentation, we found that a high degree of stability of dry sausage could be obtained by incorporating therein, in the process of manufacture, a substance of the class known as "hindered phenols" (which term will be hereinafter more fully explained), either with or without a synergist such as citric acid. A substance of this class which we discovered to be particularly effective is butylated hydroxyanisole (BHA) (the composition and characteristics of which will also be hereinafter explained in greater detail). It is therefore one of the particular objects of the invention to provide a method of treating dry sausage to improve the stability thereof by incorporating therein such a substance or combination of substances.

A further object of the invention is to provide a unique and especially effective method of introducing a preservative of the type above mentioned into the dry sausage.

Our work on this problem is predicated on a rather exhaustive study on the subject of meat pigments, the results of which will now be briefly set out herein since they deal with the interrelationship between rancidity and discoloration, or, in other words, between fats and pigments, and it is believed that without this concept it would not occur to anyone to protect meat pigments by protecting fat.

The action of rancid or oxidized fat in the pigments of cured meat such as dry sausage is very similar to that of hydrogen peroxide or the oxidase of the "green" organisms. Indeed, rancid fat will give a positive purpurogallin reaction. When a solution of nitrosyl hemoglobin is shaken in air with rancid fat, it quickly turns brown due to formation of methemoglobin. This change is much more rapid than that of nitrosyl hemoglobin shaken in air without rancid fat. A solution of nitrosyl hemochromogen in alcohol when shaken with rancid fat in the presence of air, either in the light or dark, will quickly become pale brown in color. If the time of shaking is brief, the red color can be restored by treating with nitric oxide in the absence of air, showing that cathemoglobin is formed. If the fat is exceedingly rancid or the time of shaking is several minutes, the color cannot be restored, showing that the oxidation has proceeded to the formation of porphyrins. Therefore, in the discoloration of nitrosyl hemochromogen by rancid fat, the intermediate step of cathemoglobin formation in the oxidation to porphyrins can be demonstrated.

Whenever a dry sausage is stuffed loosely or has a hole poked in it so that oxygen has ready access to the interior, a greenish discoloration around the holes will develop on standing, due to the formation of rancid fat. Italian Potenza and La Triestina sausages were poked with holes and held at 60° F. Upon examination after ten days, a strong discoloration had followed the hole through the meat. The fat in these areas was very rancid. The discolored areas gave the purpurogallin test while the undiscolored areas did not. Upon exposure of cut surfaces to air, the discoloration did not spread in 24 hours, as would be expected if it had been due to "green" organisms. The discoloration could not be reversed with nitric oxide with or without the use of reducing agents.

It thus appears that there is a definite interrelationship between fats and pigments, which phenomenon provided us with a clue to our method of protecting pigments in dry sausage and like meat products by protecting the fat contained in the product.

In our first experiments leading to the present invention, we incorporated in the dry sausage propyl gallate alone, propyl gallate with a synergist (citric acid), and propyl gallate and citric acid in combination with hydroquinone. There was no significant improvement in the stability of the dry sausage.

The first experiment showing a definitely improved stability was one using BHA and citric acid in a product known as chorizos. This product showed decided improvement in surface color and internal characteristics and a marked retardation of rancidity of the fat phase.

The BHA and citric acid were applied in this and subsequent experiments by mixing the specified quantities of BHA and citric acid intimately with the salt (sodium chloride) used in the usual manufacture of dry sausage. The quantities used, based upon the weight of meat used, were 0.006% of BHA, and 0.0015% of citric acid.

Another significant experiment was conducted in which the BHA and citric acid were incorporated in a product known as pepperoni in the manner and quantities described above. The surface color and interior quality were definitely superior to the product made without this treatment, after one month of storage at 40° F. to 50° F.

An experiment on Genoa salami was conducted adding BHA and citric acid in the manner described above. In this experiment it was first noted that the cut ends of the sausage containing BHA and citric acid did not discolor as rapidly as the regular product. Peroxide values of the fat (indicative of degree of rancidity development) were considerably lower in the treated product than in the controls, when the products were stored one month at 50° F. and at 70° F.

It is an accepted practice to use frozen meat in the manufacture of sausage. A test was made in which all trimmings were fresh, but a portion of the lot contained BHA and citric acid. Later another test was made in which part of the trimmings had been frozen for 98 days. In a portion of this lot BHA and citric acid were added. The results of the tests indicated that the stability of pepperoni made with all fresh meat and BHA and citric acid had superior keeping quality. The portion of the test containing 98 day old trimmings and antioxidants had keeping quality approximately equal to the portion in which all fresh meat, but no antioxidant, had been used. The portion containing trimmings 98 days old and no antioxidant had poor keeping quality.

In various tests of pepperoni and Genoa salami comparisons were made between treated and untreated samples. Some samples were sliced and pre-packaged in cellophane wrappers and others were unsliced. The onset of rancidity, as determined by the peroxide value of the fat (which in a product in good condition should be well under 20 milliequivalents per kilogram of fat) was determined for the different samples. The results, as recorded graphically on charts, showed that the treated samples had a degree of stability far greater than that in regular commercial dry sausage after various periods of storage.

As above noted, the chief antioxidant used in the process and product of the invention is butylated hydroxyanisole. This substance, which has heretofore been used as an antioxidant in lard, exists in two isomers, the structural formulas and scientific names of which are as follows:

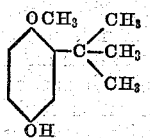

(2-tertiary butyl-4-hydroxyanisole)

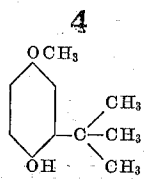

(3-tertiary butyl-4-hydroxyanisole)

Commercial preparations usually consist of mixtures of these two isomers.

As also mentioned above, BHA belongs to the class of substances known as hindered phenols. These substances have been described as "phenols carrying large branched groups, in the positions ortho to the hydroxyl, which interfere with its activity to such an extent that the phenols, upon casual examination, might easily be considered to have an ether structure."

The general class of such phenols may be represented by the formulas:

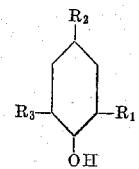

and

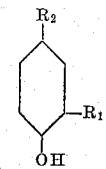

where $R_1$ = tertiary butyl or higher number of carbon atoms
$R_2$ = alkyl or alkoxy groups
$R_3$ = tertiary butyl or high number of carbon atoms which may or may not be the same as $R_1$ The hindered phenols appear to be quite soluble in fats and insoluble in water. In cases where they are more effective as antioxidants than other substances, it is not entirely clear why this is so. In the case of the present invention, it is probable that the hindered phenols dissolve in the fat, thereby protecting it from oxidation. The meat pigments are protected by not being in contact with oxidized fat. Antioxidants which are rather soluble in water but sparingly soluble in fat, tend to dissolve in the water phase and therefore do not protect the fat from oxidation.

The invention contemplates not only the use of BHA but also any of the hindered phenols which are non-toxic. Another such substance which may be mentioned by way of example is butylated hydroxytoluene (BHT), the structural formula and scientific name of which is as follows:

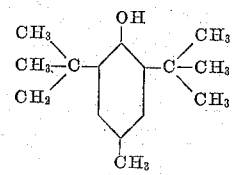

(2,6-di-tertiary-butyl-p-cresol)

Two other compounds coming within the general class may be represented as follows:

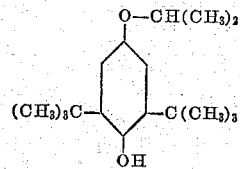

(3-5 di-tertiary butyl 4 hydroxy phenyl isopropyl ether)

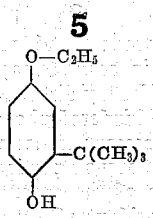

(2 tertiary butyl 4 ethoxy phenol)

We have found that in some instances a combination of antioxidant compounds, such as BHA and BHT, may be advantageously used instead of a single compound.

For the purpose of introducing the antioxidant into dry sausage, we have developed what we believe to be a novel procedure for obtaining proper distribution of the minute quantities of the antioxidant throughout the meat mass. One of the limiting factors in the effective use of antioxidants in meat products has been the difficulty in attainment of such proper distribution.

One patented method of introducing a different type of antioxidant into the meat mass consists essentially in the preparation of a solution of nordihydroguaiaretic acid (NGA) in glyceryl monostearate and dispersion of this "mother batch" on salt heated to between 145° F. and 160° F. In another patented method the antioxidants and synergists are dissolved in polyhydric alcohol such as propylene glycol or glycerine and the solution is dispersed on salt. Neither of these procedures is satisfactory for dispersion of an antioxidant of the hindered phenol type such as BHA in a comminuted meat product such as dry sausage.

We have therefore developed the above-mentioned special process, which we have found well suited to our purposes. In general it comprises heating the BHA, or other hindered phenol, to a temperature above its melting point, which in the case of BHA and BHT, for example, is about 58° C. in the one case and about 70° C. in the other, and then adding the melted antioxidant to salt that has also been pre-heated to a temperature above the melting point of the antioxidant. The heated salt is placed in a mechanical mixer and the melted antioxidant is added while the salt is being mixed. The salt and antioxidant are mixed for a sufficient length of time to insure uniform coating of the salt crystals with liquid antioxidant, and then the temperature of the mixture is lowered to below the melting point of the antioxidant, while continually mixing.

This procedure results in the formation of a thin film of antioxidant upon the surface of the salt crystals and insures uniform distribution of the antioxidant on the salt.

An alternative procedure is to pre-heat the salt to about 10 degrees above the melting point of the antioxidant that is to be used, then place the heated salt in a mechanical mixer and, while mixing, add the solid antioxidant previously ground to a fine particle size. The antioxidant quickly melts and is dispersed on the surfaces of the salt crystals. The mixing is then continued until the temperature of the salt drops to about 15 degrees below the melting point of the antioxidant, or until the salt mixture has dry, free-flowing characteristics indicating that the antioxidant has all been re-solidified on the salt crystals.

Another procedure that we have used successfully is to grind the solid antioxidant to a fine particle size, then mix the solid antioxidant with cool salt in a mechanical mixer. The mixture is then heated, while mixing, above the melting point of the antioxidant and allowed to cool to below the melting point of the antioxidant while continually mixing. This method is satisfactory, but more time-consuming than the first method cited.

In the use of our method, when the antioxidant salt is mixed into cold comminuted dry sausage, the antioxidant is completely dispersed throughout the meat and is readily available to be dissolved in the fat phase. The salt crystals dissolve in the water phase which predominates in the lean tissue, while the antioxidant dissolves in the fat tissue which has a low moisture content.

More specifically, in the practice of our process the dispersion of the BHA or other hindered phenol type of antioxidant on the salt base may be accomplished in the following manner:

The salt is heated by suitable means to a temperature of at least 5° F., and preferably 10° F., above the melting point of the antioxidant or antioxidants to be used. The dry, heated salt is then placed in a suitable mixing apparatus and the antioxidant, previously ground fine enough to pass a 20 mesh screen or heated until it becomes liquid, is then placed on the salt while mixing. In either case, the antioxidant becomes a liquid upon contact with the heated salt and is uniformly spread over the surface of the salt crystals in the mixer.

The salt-antioxidant mixture is mixed for a sufficient length of time to insure uniform coating on the salt crystals and then allowed to cool, while mixing, to a temperature below the melting point of the antioxidant, thus allowing the antioxidant to recrystallize upon the surface of the salt crystals. This procedure assures a uniform distribution of the antioxidant on the salt, without any difficulty with caking of the salt upon subsequent storage.

If it is desired to add a synergist such as citric acid or ascorbic acid to the mixture, the synergist should be in powder form, and can be mixed with the salt before addition of the antioxidant or it can be dispersed in the antioxidant before the antioxidant is added to the salt.

We prefer to make a "mother batch" of antioxidant salt using approximately 10% antioxidant, and 90% salt prepared by the above procedure. This "mother batch" can then be diluted further in additional salt by the simple process of mixing without additional heating to provide the desired concentration of antioxidant in the final salt.

The effective concentrations of antioxidant to be used in the dry sausage may be as low as $1/10,000$ of 1%, based on the weight of the meat, or may be as high as $1/10$ of 1%. We prefer to use a concentration of about $3/1,000$ of 1% of a single hindered phenol antioxidant or $6/1,000$ of 1% of a combination of hindered phenol antioxidants.

When a synergist is used in combination with the antioxidant or antioxidants we prefer to use about $1/4$ as much synergist as we use of the antioxidant, but the proportion may vary from $1/100$ of the antioxidant used to equal parts of synergist and antioxidant.

When the final dilution of antioxidant and synergist has been prepared on the salt base, the proper quantity of antioxidant salt is mixed with the salt, sugar, spices, etc. that are added to the meat mass at the time of chopping to form the characteristics of the meat food product desired. The quantity of the antioxidant salt used may vary from one ounce to four pounds per 100 pounds of meat, but we prefer to control the concentration of the antioxidant salt so that approximately 8 ounces of the antioxidant salt are added per 100 pounds of meat.

After addition of the antioxidant, salt, spices, etc., the meat mixture is mixed in accordance with the usual practice to obtain a uniform product.

We have made some tests of dry sausage (specifically D'Annunzio, Sicilian type salami) to compare samples containing BHA alone and BHA plus a synergist (specifically citric acid) against a control with the same meat formula but containing no antioxidant. After 22 days of storage the control sample was definitely rancid and discolored, with a peroxide value of 22 milliequivalents per 1000 grams of fat. Those samples containing BHA only and BHA plus citric acid showed very little deterioration, having peroxide values of 3 meq./1000 and 2 meq./1000, respectively. After 30 days the control had a peroxide value of 25 meq./1000, whereas in the other samples the values were 2.5 meq./1000 and 5 meq./1000, respectively. Any peroxide values in excess of 20 milliequivalents per kilogram of fat indicate that the sausage is definitely objectionable by visual and organoleptic evaluation techniques.

Although these tests did not show any very significant differences as between the samples containing BHA and those containing BHA plus a synergist, there are situations in which the synergists may be useful. An example of such a situation would be the presence of abnormally large traces of metallic catalysts in the meat product. Relatively small amounts of iron or copper promote oxidation reactions. Citric acid and other synergists such as tartaric acid and phosphoric acid, or the esters or salts of these acids, tend to thwart this action by sequestering the iron or copper. Therefore the invention may be regarded as directed to the use of the hindered phenol type of antioxidant with or without the synergist.

It by no means follows that an antioxidant which is effective to prolong the useful life of fats such as lard would protect a product such as dry sausage from rancidity and discoloration. In fact we have found that some antioxidants which are excellent for inhibiting rancidity in lard will not effectively protect dry sausage, in which maintenance of good color is perhaps even more important from a commercial standpoint than protection against a certain degree of rancidity. In this connection a brief discussion of the phenomenon of oxidation is deemed pertinent for an understanding of the present invention.

Numerous organic molecular species have sensitive constituent groups which are readily subject to oxidation. For example, fats usually contain molecules with unsaturated double bonds between carbons atoms. These are particularly sensitive to oxidation and the net result of such oxidation, carried to its final stages, is the phenomenon known as rancidity. Rancidity is characterized by unpleasant flavors and odors. Since flavors and odors are more or less subjective properties, there is a great difference between individuals and, even races, in their reactions to various flavors and odors, including rancidity which is not too advanced.

Another group of substances which are readily subject to oxidation are the meat pigments. These include myoglobin and hemoglobin and their derivatives. Such substances contain iron. The pigments have a desirable color when the iron is in the reduced or ferrous state. When the iron is oxidized to the ferric state these iron-containing pigments take on unpleasing colors. Oxidation may proceed even further until there is cleavage of internal bonds in the pigment molecule. The resulting products have extremely objectionable colors as judged by practically all consumers of meat.

The commonest agent for producing oxidation is oxygen of the air. An even more active form of oxygen is the peroxide form. This is quite aggressive in oxidizing meat pigment. When oxygen of the air oxidizes fat, the first thing that is formed is a fat peroxide. This fat peroxide is effective in oxidizing meat pigment. The oxidized forms of meat pigments, in turn, are capable of promoting the oxidation of fat.

The hindered phenols are stabilizers for these systems because they interfere with or "hinder" the oxidative processes. They are capable of inhibiting oxidation by breaking the chain of reaction.

By our invention we have provided not only a highly effective method of protecting dry sausage against both rancidity and discoloration for long periods of time, but a stable product of this character which has very decided comercial advantages over any such product heretofore marketed, so far as we are aware.

While in the foregoing description we have set forth illustrative examples of our process and product, it will be understood that various modifications and variations of the invention may be made by those skilled in the art without departing from the spirit and scope thereof.

We claim:

1. The process of treating dry sausage to protect the same against discoloration and rancidity, which comprises incorporating in such sausage, in the process of manufacture, and uniformly distributing in the meat mass an antioxidant of the hindered phenol type in an amount not less than that necessary to act effectively as an antioxidant upon substantially all portions of the sausage and not greatly in excess of the amount required to do so with maximum antioxidant effect, such amount not exceeding about $1/10$ of 1% of the meat based on weight.

2. The process of treating dry sausage to protect the same against discoloration and rancidity, which comprises incorporating in such sausage, in the process of manufacture, and uniformly distributing in the meat mass an antioxidant of the hindered phenol type in an amount not less than that necessary to act effectively as an antioxidant upon substantially all portions of the sausage and not greatly in excess of the amount required to do so with maximum antioxidant effect, such amount not exceeding about $1/10$ of 1% of the meat based on weight and a synergist in an amount not exceeding such amount of the antioxidant.

3. The process of treating dry sausage to protect the same against discoloration and rancidity, which comprises incorporating in such sausage, in the process of manufacture, and uniformly distributing in the meat mass an antioxidant of the hindered phenol type in an amount not less than that necessary to act effectively as an antioxidant upon substantially all portions of the sausage and not greatly in excess of the amount required to do so with maximum antioxidant effect, such amount not exceeding about $1/10$ of 1% of the meat based on weight, said antioxidant being butylated hydroxyanisole.

4. The process of treating dry sausage to protect the same against discoloration and rancidity, which comprises incorporating in such sausage, in the process of manufacture, and uniformly distributing in the meat mass an antioxidant of the hindered phenol type in an amount not less than that necessary to act effectively as an antioxidant upon substantially all portions of the sausage and not greatly in excess of the amount required to do so with maximum antioxidant effect, such amount not exceeding about $1/10$ of 1% of the meat based on weight, and a synergist in an amount not exceeding such amount of the antioxidant, said antioxidant being butylated hydroxyanisole and said synergist being citric acid.

5. The process of treating dry sausage to protect the same against discoloration and rancidity, which comprises incorporating in such sausage, in the process of manufacture, and uniformly distributing in the meat mass an antioxidant of the hindered phenol type in an amount between about $1/10,000$ and about $1/10$ of 1%, based on the weight of the meat.

6. The process of treating dry sausage to protect the same against discoloration and rancidity, which comprises incorporating in such sausage, in the process of manufacture, and uniformly distributing in the meat mass an antioxidant of the hindered phenol type, said antioxidant being butylated hydroxyanisole in an amount between about $1/10,000$ and about $1/10$ of 1%, based on the weight of the meat.

7. The process of treating dry sausage to protect the same against discoloration and rancidity, which comprises incorporating in such sausage, in the process of manufacture, and uniformly distributing in the meat mass an antioxidant of the hindered phenol type, said antioxidant being butylated hydroxyanisole in an amount between about $3/1000$ and about $6/1000$ of 1%, based on the weight of the meat.

8. The process of treating dry sausage to protect the same against discoloration and rancidity, which comprises incorporating in such sausage, in the process of manufacture, and uniformly distributing in the meat mass an antioxidant of the hindered phenol type and a synergist, said antioxidant being used in an amount between $1/10,000$ and about $1/10$ of 1%, based on the weight of the meat, and said synergist being used in an amount between about 1/100 of the antioxidant and equal parts of antioxidant and synergist.

9. The process of treating dry sausage to protect the same against discoloration and rancidity, which comprises the steps of heating an antioxidant of the hindered phenol type to a point above its melting point, heating salt to a point above the melting point of the antioxidant, adding the melted antioxidant to the pre-heated salt while the salt is being agitated, continuing the agitation for a long enough time to insure uniform coating of the salt crystals with the melted antioxidant, lowering the temperature to a point substantially below the melting point of the antioxidant while continuing the agitation, and adding the antioxidant-coated salt, with other customary ingredients, to the meat mass at the time of chopping of the latter in the usual procedure of making the sausage, the amount of the antioxidant so introduced not exceeding about 1/10 of 1% of the meat based on weight.

10. The process of treating dry sausage to protect the same against discoloration and rancidity, which comprises incorporating in sausage, in the process of manufacture, and uniformly distributing in the meat mass an antioxidant of the hindered phenol type in an amount not exceeding about 1/10 of 1% of the meat based on weight, said antioxidant being butylated hydroxytoluene.

11. The process of treating dry sausage to protect the same against discoloration and rancidity, which comprises incorporating in the sausage, in the process of manufacture, and uniformly distributing in the meat mass minute quantities of butylated hydroxyanisole and butylated hydroxytoluene in a total amount not exceeding about 1/10 of 1% of the meat based on weight.

12. The process of treating dry sausage to protect the same against discoloration and rancidity, which comprises incorporating in the sausage, in the process of manufacture, and uniformly distributing in the meat mass butylated hydroxyanisole and butylated hydroxytoluene in a total amount of about 9/1000 of 1%, based on the weight of the meat.

13. The process of treating dry sausage to protect the same against discoloration and rancidity, which comprises incorporating in such sausage, in the process of manufacture, and uniformly distributing in the meat mass an antioxidant of the hindered phenol type, said antioxidant being butylated hydroxyanisole in an amount of about 9/1000 of 1%, based on the weight of the meat.

14. The process of treating dry sausage to protect the same against discoloration and rancidity, which comprises the steps of heating an antioxidant of the hindered phenol type, and salt to a point above the melting point of the antioxidant, agitating the salt and antioxidant while at a temperature above such melting point for long enough time to insure uniform coating of the salt crystals with liquid antioxidant, lowering the temperature of the mixture to a point substantially below the melting point of the antioxidant while continuing the agitation, and adding the antioxidant-coated salt, with other customary ingredients, to the meat mass at the time of chopping of the latter in the usual procedure of making the sausage, the amount of the antioxidant so introduced not exceeding about 1/10 of 1% of the meat based on weight.

References Cited in the file of this patent

UNITED STATES PATENTS

| | | |
|---|---|---|
| 2,355,548 | Musher | Aug. 8, 1944 |
| 2,683,694 | Hoffman et al. | July 13, 1954 |
| 2,690,396 | Chenicek | Sept. 28, 1954 |
| 2,704,746 | Chenicek | Mar. 22, 1955 |
| 2,707,154 | Lehmann et al. | Apr. 26, 1955 |
| 2,741,563 | Robertson | Apr. 10, 1956 |

OTHER REFERENCES

"Food Technology," May 1952, pp. 194, 195 and 196, article entitled Ascorbic Acid and Meat Color by B. M. Watts, et al.

"Food Technology," vol. 7, November 1953, pp. 429, 430 and 431, article entitled Antioxidant Treatment for Bacon.

"Chemicals and the Meat Industry," by H. R. Kraybill, Circular No. 14, June 1955, published by American Meat Institute Foundation, 939 East 57th Street, Chicago 37, Illinois, pp. 1 to 10 inclusive.